US 012140775B2

(12) United States Patent
Ünlü et al.

(10) Patent No.: US 12,140,775 B2
(45) Date of Patent: Nov. 12, 2024

(54) EFFICIENT AND UNIFORM COLOR-LIGHT INTEGRATION DEVICE

(71) Applicant: Trustees of Boston University, Boston, MA (US)

(72) Inventors: M. Selim Ünlü, Newton, MA (US); Mete Aslan, Brighton, MA (US); Iris Celebi, Allston, MA (US); Celalettin Yurdakul, Santa Clara, CA (US); Allison Marie Marn, Winchester, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/226,483

(22) Filed: Jul. 26, 2023

(65) Prior Publication Data

US 2024/0036339 A1    Feb. 1, 2024

Related U.S. Application Data

(60) Provisional application No. 63/452,047, filed on Mar. 14, 2023, provisional application No. 63/392,639, filed on Jul. 27, 2022.

(51) Int. Cl.
*G02B 27/09* (2006.01)
*G02B 21/08* (2006.01)
*G02B 27/48* (2006.01)

(52) U.S. Cl.
CPC ......... *G02B 27/0927* (2013.01); *G02B 21/08* (2013.01); *G02B 27/0916* (2013.01); *G02B 27/48* (2013.01)

(58) Field of Classification Search
CPC ............. G02B 27/0927; G02B 27/0916; G02B 27/48; G02B 21/08
(Continued)

(56) References Cited

U.S. PATENT DOCUMENTS

| 6,437,861 B1 | 8/2002 | Kuta |
| 2005/0259437 A1 | 11/2005 | Klein |

(Continued)

FOREIGN PATENT DOCUMENTS

| CN | 212986839 U | 4/2021 |
| CN | 113687504 A | 11/2021 |

OTHER PUBLICATIONS

Invitation to Pay Additional Fees and, Where Applicable, Protest Fee mailed in International Application No. PCT/US2023/028662 on Oct. 2, 2023.

(Continued)

*Primary Examiner* — Wyatt A Stoffa
*Assistant Examiner* — Mitchell T Oestreich
(74) *Attorney, Agent, or Firm* — Cesari and McKenna, LLP; Steven M. Mills

(57) ABSTRACT

An exemplary illumination source is provided. The illumination source includes a light integrating device for coupling to at least one optical structure at an output port. The light integrating device includes at least one input port. At least one light source produces at least one optical illumination coupled to the at least one input port. A light adjusting tool controls the optical illumination emitted by the light integrating device. The light adjusting tool controls uniformity of light emitted by the light integrating device by modifying at least one internal surface of the light integrating device.

14 Claims, 21 Drawing Sheets

(58) Field of Classification Search
USPC .......................................................... 359/385
See application file for complete search history.

(56) References Cited

U.S. PATENT DOCUMENTS

2006/0152931 A1   7/2006   Holman
2009/0103293 A1*  4/2009   Harbers ................. F21V 14/08
                                                  362/230

OTHER PUBLICATIONS

Aggarwal et al., "On Cosine-fourth and Vignetting Effects in Real Lenses," IEEE, pp. 472-479, 2001.

Carr, "Integrating Sphere Theory and Applications Part II: Integrating Sphere Applications," Surface Coatings International, vol. 10, pp. 485-490, 1997.

Celebi et al., "Instrument-Free Protein Microarray Fabrication for Accurate Affinity Measurements," Biosensors, vol. 10, No. 11, pp. 1-11, 2020.

Coumans et al., "Flat-Top Illumination Profile in an Epifluorescence Microscope by Dual Microlens Arrays," International Society for Advancement of Cytometry, vol. 81, pp. 324-331, 2012.

Daaboul et al., "High-Throughput Detection and Sizing of Individual Low-Index Nanoparticles and Viruses for Pathogen Identification," Nano Letters, vol. 10, pp. 4727-4731, 2010.

Deschamps et al., "Efficient homogeneous illumination and optical sectioning for quantitative single single-molecule localization microscopy," Optics Express, vol. 24, No. 24, pp. 28080-28090, 2016.

Douglass et al., "Super-resolution imaging of multiple cells by optimized flat-field epi-illumination," Nature Photonics, vol. 10, pp. 705-710, 2016.

Herbert et al., "Enhanced Epifluorescence Microscopy by Uniform and Intensity Optimized Illumination," International Society for the Advancement of Cytometry, vol. 81, pp. 278-280, 2012.

Hu et al., "Quadrature Multiplexed Structured Illumination Imaging," IEEE Photonics Journal, vol. 12, No. 2, pp. 1-9, 2020.

Izadi et al., "Wide Area Uniform Illumination Scheme Using LED Matrix for Optogenetic Cardiac Pacing," Photonics, vol. 8, pp. 1-12, 2021.

Ji et al., "Non-uniformity correction of wide field of view imaging system," Optics Express, vol. 30, No. 12, pp. 22123-22134, 2022.

Khaw et al., "Flat-field illumination for quantitativefluorescence imaging," Optics Express, vol. 26, No. 12, pp. 15276-15288, 2018.

Levenson et al., "Multispectral Imaging in Biology and Medicine: Slices of Life," Cytometery Part A, vol. 69, pp. 748-758, 2006.

Mau et al., "Fast widefield scan provides tunable and uniform illumination optimizing super-resolution microscopy on large fields," Nature Communications, vol. 12, pp. 1-11, 2021.

Meng et al., "Spectrally Resolved Fiber Photometry for Multicomponent Analysis of Brain Circuits," Neuron, vol. 98, pp. 707-717, 2018.

Model et al., "A Standard for Calibration and Shading Correction of a Fluorescence Microscope," Cytometry, vol. 44, pp. 309-316, 2001.

Repina et al., "Engineered Illumination Devices for Optogenetic Control of Cellular Signaling Dynamics," Cell Reports, vol. 31, pp. 1-17, 2020.

Sawyer et al., "Evaluation of illumination system uniformity for wide-field biomedical hyperspectralimaging," Journal of Optics, vol. 19, pp. 1-10, 2017.

International Search Report and Written Opinion of International Application No. PCT/US2023/028662 mailed on Feb. 7, 2024.

* cited by examiner

| System | EUCLID | Kohler Integrator | PiShaper | TopShape |
|---|---|---|---|---|
| Plateau Uniformity (%) | 1.8 / 2.1 | 6.2 | 9.0 | 10.0 |
| Flatness Factor (%) | 96.5 / 96.5 | 84.4 | 73.5 | 67.3 |
| Source | LED / Laser | Laser | Laser | Laser |

FIG. 11

EFFICIENT AND UNIFORM COLOR-LIGHT INTEGRATION DEVICE

RELATED APPLICATIONS

This application claims priority to U.S. provisional application No. 63/392,639 filed on Jul. 27, 2022, and U.S. provisional application No. 63/452,047, filed on Mar. 14, 2023, the entire contents of which are incorporated herein by reference.

GOVERNMENT SUPPORT

This invention was made with government support under Grant No. 1941195 awarded by the National Science Foundation. The government has certain rights in the invention.

BACKGROUND

In optical imaging and sensing systems, illumination quality is of paramount importance particularly for quantitative optical microscopy. Typical optical imaging systems are comprised of light illumination and collection components including multiple optical elements. Both illumination and collection paths have characteristic optical transfer functions affecting the field uniformity, which leads to a uneven illumination profile. Thus, a technique is needed that improves light uniformity.

SUMMARY

According to one aspect of the subject matter described in this disclosure, an exemplary illumination source is provided. The illumination source includes a light integrating device for coupling to at least one optical structure at an output port. The light integrating device includes at least one input port. At least one light source produces at least one optical illumination coupled to the at least one input port. A light adjusting tool controls the optical illumination emitted by the light integrating device. The light adjusting tool controls uniformity of light emitted by the light integrating device by modifying at least one internal surface of the light integrating device.

In some implementations, the at least one input port and the output port may be positioned not to face each other on the at least one internal surface of the light integrating device. The light integrating device may include an internal shape nominally conical. The light integrating device may include an apex at the output port coupling to the at least one optical structure. The apex angle may be optimized to maximize light coupled to the at least one optical structure at the output port. The at least one light source may include a light emitting diode (LED) at the at least one input port. The at least one light source may include a plurality of LEDs at the at least one input port. The light source may include at least one laser at the at least one input port. The at least one laser may be mechanically vibrated. The light source may include at least one fiber-coupled laser delivering the at least one optical illumination into the light integrating device through a fiber. The fiber may be mechanically vibrated. The light adjusting tool may include a manual adjustment knob positioned at a distal end of the light adjusting tool for modifying the internal surface. The internal surface of the light integrating device may include diffused reflecting material. The light integrating device may include polytetrafluoroethylene (PTFE).

According to one aspect of the subject matter described in this disclosure, another exemplary illumination source is provided. The illumination source includes a light integrating device for coupling to at least one optical structure at an output port. The light integrating device includes at least one input port. At least one laser source is coupled to at least one vibration source provides light input to the at least one input port. The light integrating device homogenizes the light input from the at least one laser source to emit speckle-free uniform laser illumination at an output port of the light integrating device.

In some implementations, the at least one input port and the output port may be positioned not to face each other on an internal surface of the light integrating device. The light integrating device may include an internal shape nominally conical. The light integrating device may include an apex at the output port coupling to the at least one optical structure. The apex angle is optimized to maximize light coupled to the at least one optical structure at the output port. The internal surface of the light integrating device may include a diffused reflecting material. The light integrating device may include polytetrafluoroethylene (PTFE). The at least one laser source may include a plurality of laser sources for providing light input to the light integration device at the same or different wavelengths at the at least one input port. The at least one laser source may include at least one fiber-coupled laser delivering the at least one optical illumination into the light integrating device thru a fiber. The at least one fiber-coupled laser may include a multi-mode fiber. The fiber may be mechanically vibrated.

According to another aspect of the subject matter described in this disclosure, an exemplary method for producing illumination is provided. The method includes the following: providing a light integrating device for coupling to at least one optical structure at an output port, where the light integrating device includes at least one input port; producing, using at least one light source, at least one optical illumination, the at least one light source coupled to the at least one input port; and controlling, using a light adjusting tool, the optical illumination emitted by the light integrating device, wherein the light adjusting tool controls uniformity of light emitted by the light integrating device by modifying at least one internal surface of the light integrating device.

In some implementations, the at least one input port and the output port may be positioned not to face each other on the at least one internal surface of the light integrating device. The light integrating device may include an internal shape nominally conical. The light integrating device may include an apex at the output port coupling to the at least one optical structure. The apex angle may be optimized to maximize light coupled to the at least one optical structure at the output port. The at least one light source may include a light emitting diode (LED) at the at least one input port. The at least one light source may include a plurality of LEDs at the at least one input port. The light source may include at least one laser at the at least one input port. The at least one laser may be mechanically vibrated. The light source may include at least one fiber-coupled laser delivering the at least one optical illumination into the light integrating device through a fiber. The fiber may be mechanically vibrated. The light adjusting tool may include a manual adjustment knob positioned at a distal end of the light adjusting tool for modifying the internal surface. The internal surface of the light integrating device may include diffused reflecting material. The light integrating device may include polytetrafluoroethylene (PTFE).

According to another aspect of the subject matter described in this disclosure, an exemplary method for producing illumination is provided. The method includes the following: providing a light integrating device for coupling to at least one optical structure at an output port, where the light integrating device includes at least one input port; producing, using at least one laser source coupled to at least one vibration source, light input to the at least one input port; and delivering, at an output port of the light integrating device, speckle-free and uniform laser illumination, wherein the light integrating device homogenizes the light input from the at least one laser source.

In some implementations, the at least one input port and the output port may be positioned not to face each other on an internal surface of the light integrating device. The light integrating device may include an internal shape nominally conical. The light integrating device may include an apex at the output port coupling to the at least one optical structure. The apex angle is optimized to maximize light coupled to the at least one optical structure at the output port. The internal surface of the light integrating device may include a diffused reflecting material. The light integrating device may include polytetrafluoroethylene (PTFE). The at least one laser source may include a plurality of laser sources for providing light input to the light integration device at the same or different wavelengths at the at least one input port. The at least one laser source may include at least one fiber-coupled laser delivering the at least one optical illumination into the light integrating device thru a fiber. The at least one fiber-coupled laser may include a multi-mode fiber. The fiber may be mechanically vibrated.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

FIG. 9 are images acquired with direct coupling of a vibrated multi-mode fiber (MMF) and EUCLID outputs with vibration OFF and ON.

FIG. 11 is a table of a performance comparison between EUCLID and other solutions in the prior art.

DETAILED DESCRIPTION

Figure 1A:
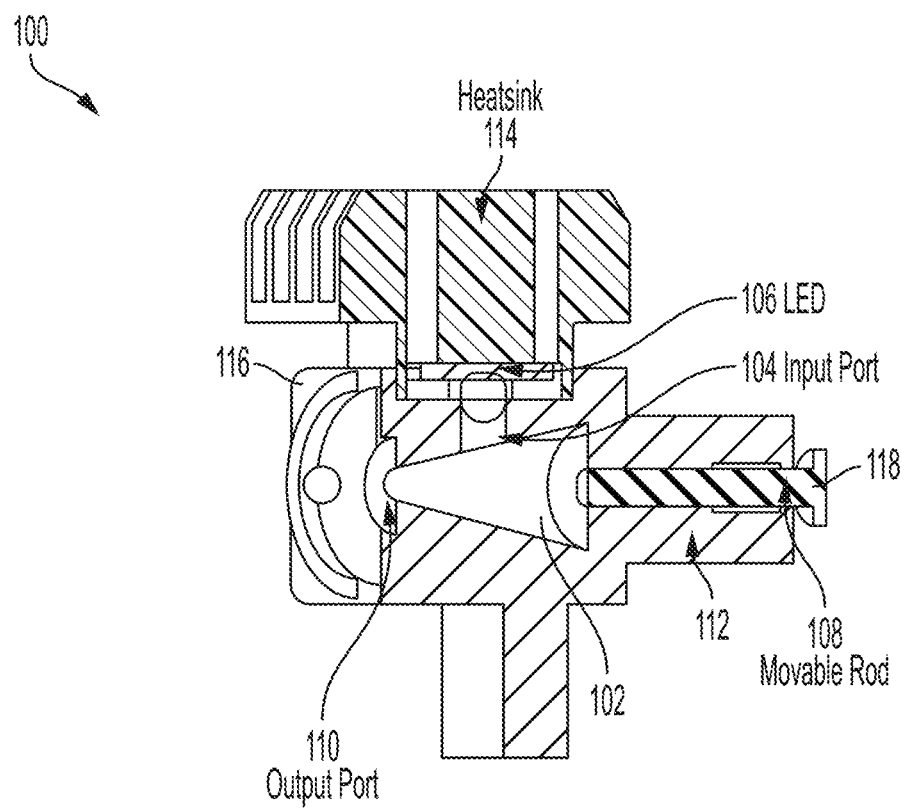
FIGS. 1A-1B are schematic diagrams of cross-sectional view of an example Efficient and Uniform Color-Light Integration Device (EUCLID).

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

A light integrating device and methods associated therewith for improved efficiency of light coupling to optical illumination optics as well as the uniformity of the overall illumination at the object plane are described herein. The light integrating device can be applied to Critical Illumination as well as Köhler illumination. The light source design is termed "Efficient and Uniform Color-Light Integration Device (EUCLID)" that (i) increases light coupling efficiency and (ii) improves illumination uniformity.

Köhler illumination is preferred over critical illumination in modern scientific light microscopy although it requires additional optics. The primary advantage of Köhler illumination is the uniform illumination of the sample at the cost of reduced light coupling efficiency. Uniformity of Köhler illumination is still limited partially due to imperfect optical transfer function of the optical illumination path.

EUCLID can directly impact the performance of Interferometric Reflectance Imaging Sensor (IRIS) systems by providing stronger illumination thus better signal to noise ratio as well as improved illumination uniformity. It can also be used to improve image performance of brightfield light microscopes.

FIG. 1A is a schematic diagram of cross-sectional view of an example EUCLID 100. EUCLID 100 includes a conical cavity 102, input port 104, light emitting diode (LED)106, movable rod 108, output port 110, and heatsink 114. Conical cavity 102 is connected to input port 104 and output port 110. Input port 104 receives light or illumination from LED 106 and guides the received light to conical hollow cavity 102. Output port 110 receives the light/illumination outputted by conical cavity 102. Moreover, output port 100 couples the received light/illumination to an optical structure 116. Input port 104 and output port 110 are positioned not to face each other on the internal surface of conical cavity 102. In some implementations, input port 104 and output port 110 may be connected to the light integrating device at different positions that are orthogonal from each other without facing the other.

Figure 1B:
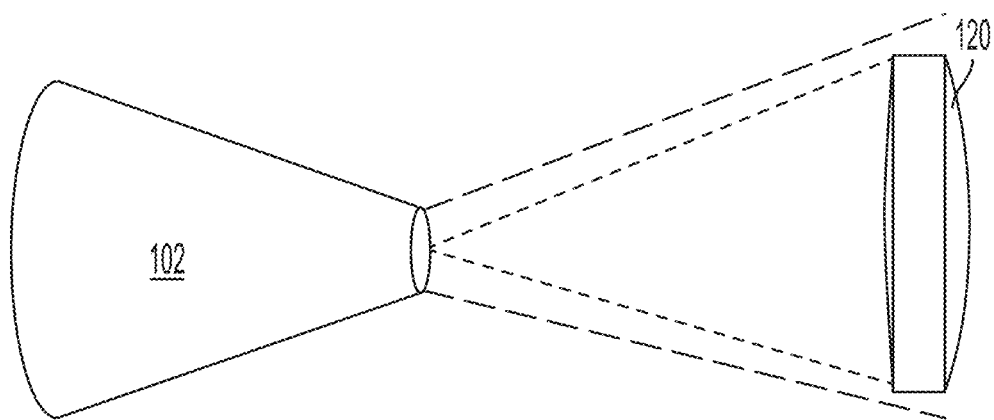

FIG. 1B shows the conical shape of conical cavity 102 being optimally designed so the light emitted from conical cavity 102 optimally matches a receiving optical structure 120 to maximize light received, such as a lens, numerical aperture optical elements, or the like. The efficiency increases because most of the light emitted from conical cavity is directed to the receiving optical structure 120. Conical cavity 102 may include an apex at output port 110 coupling to at least one optical structure 120. The apex angle may be optimized to maximize light coupled to optical structure 120 at the output port 110. The internal surface of conical cavity 102 may include a highly and diffused reflecting material. Conical cavity 102 may include polytetrafluoroethylene (PTFE) or the like.

Optical structure 116 may be any lens structure or camera arrangement, such as an objective lens, aspherical lens, collimated lens, condenser lens, or any combination of lens structures. Movable rod 108 is positioned at a distal end of conical hollow cavity 102. Moreover, movable rod 108 is placed in a hollow cylindrical cavity 112 allowing movable rod 108 to move axially at various distances from the distal end of conical cavity 102. Heat sink 114 removes heat produced by EUCLID when in operation to protect its components.

One can achieve an improvement in illumination uniformity if the angular content of the illumination source can be modified. To a first order approximation, light exiting conical cavity 102 at output port 110 comes entirely from the back surface of conical cavity 102. Hence, EUCLID 100 modifies the angular content of its output by changing the structure back surface of conical cavity 102 using movable rod 108. When movable rod 108 is fully inserted, the back of conical cavity 102 becomes a flat surface. Movable rod 108 may be an absorber (or diffused reflector) that can be moved axially by turning a knob 118 or the like, controlling the reduction of axial light thus suppressing the peak of the gaussian-like distribution of the light profile resulting in a flatter profile.

In other implementations, EUCLID may have a hole (of different diameters) in the back of conical cavity 102 with movable rod 108 to provide an adjustable radiance profile (low output angles). Movable rod 108 may be a Teflon rod with uniform surface. The end surface of the rod can be fabricated with a secondary structure to further manipulate the light uniformity.

Figure 2:
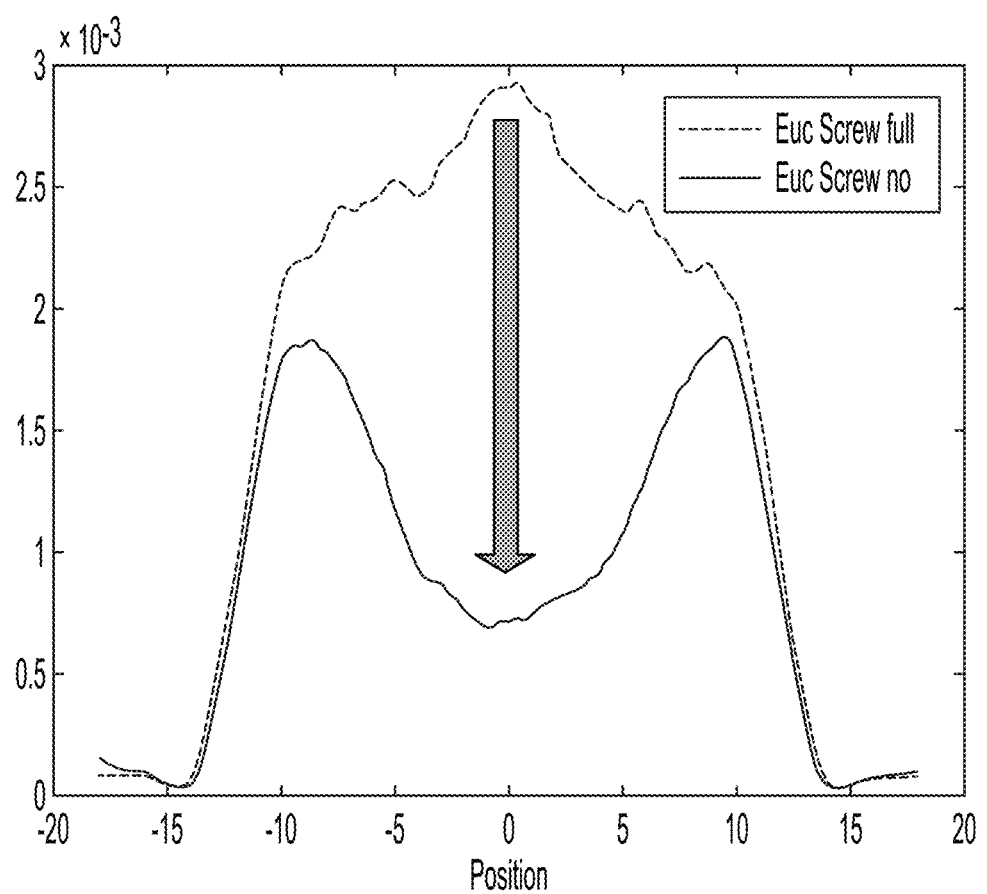
FIG. 2 are preliminary Zemax simulations of light distribution on a camera for a EUCLID design in a Köhler illumination configuration.

FIG. 2 illustrates preliminary Zemax simulations of light distribution on a camera for a EUCLID design in a Köhler illumination configuration as movable rod 108 is moved from a position flush to the flat part of conical cavity 102 to its distal end (effectively leaving a hole). While these preliminary simulations display fluctuations due to small number of rays used in Zemax, they clearly demonstrate that the illumination pattern can be manipulated broadly using a EUCLID design. Beyond the design illustrated in FIG. 1, various other patterns may be implemented on the back surface of EUCLID.

Figure 3:
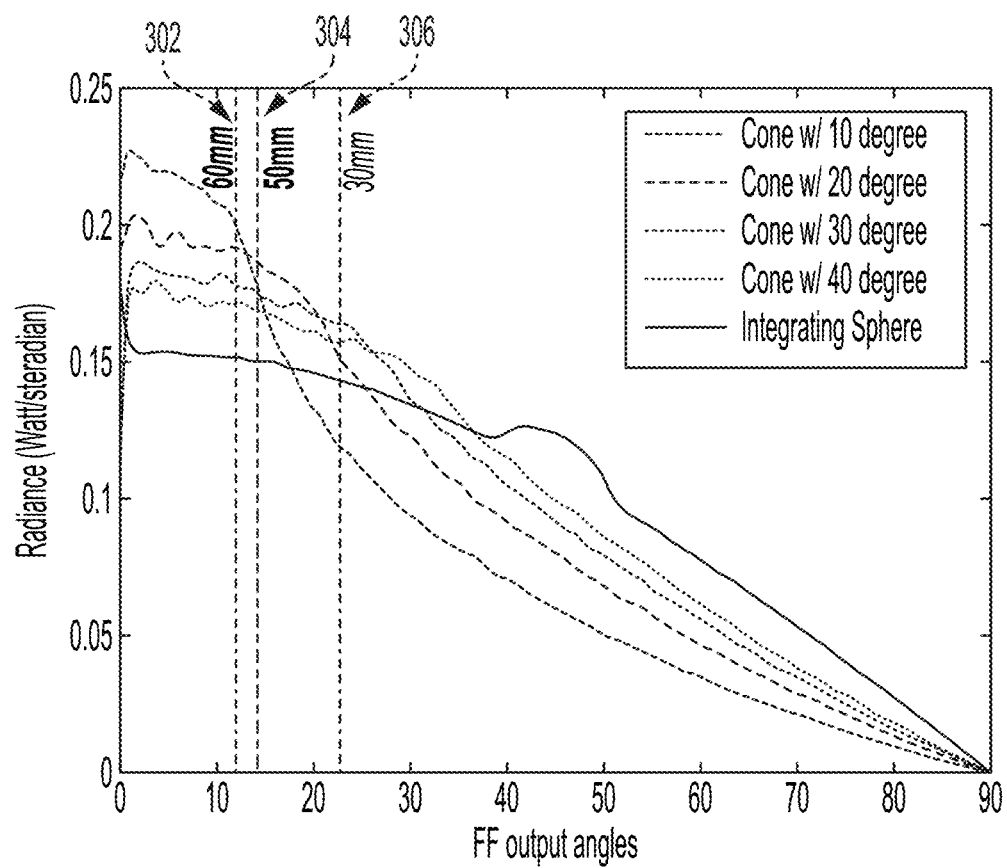
FIG. 3 are simulated output radiance cross sections of conical and sphere light integrating devices (LIDs).

Various conical light integrated devices (LIDS) have been designed and tested. Various conical devices were built with an LED input port and various sizes of light output ports. The cone angles are varied (from 10 to 46 degrees) to fit collimating lens focal distances and numerical apertures. These fix conical designs improved the light coupling efficiency to collimation lenses. FIG. 3 shows the simulated output radiance cross sections of conical and sphere LIDs. Vertical dashed lines 302, 304, 306 represent acceptance angles for employed lenses in the illumination path. The bump at 45° in the integrated sphere (IS) radiance is due to first reflections of the initial rays that are exiting IS without reflecting twice.

Figure 4:
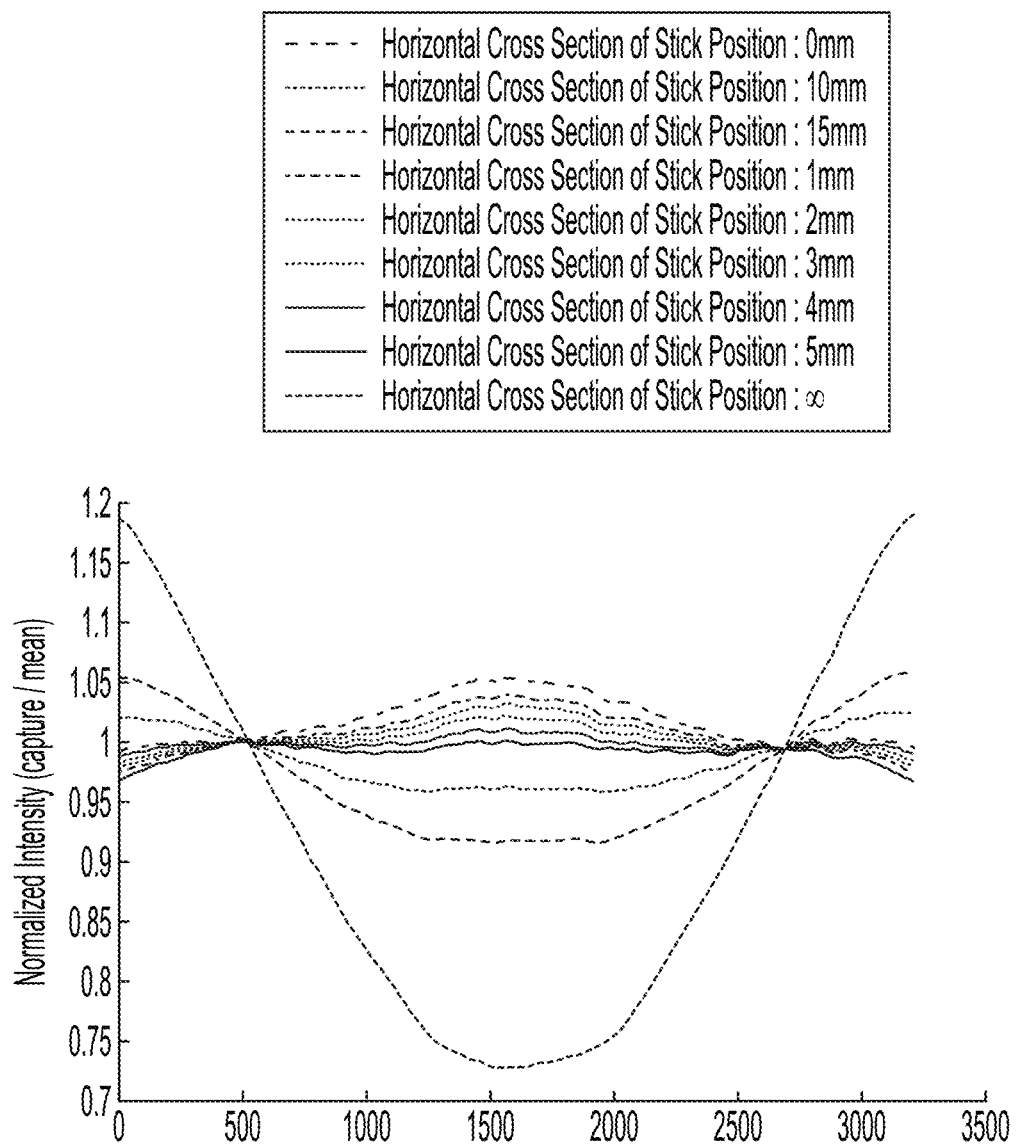
FIG. 4 are experimental results indicating the illumination profile can be controlled from bright center to dark center and achieving nearly flat illumination pattern.

FIG. 4 shows the experimental results indicating the illumination profile can be controlled from bright center to dark center and achieving nearly flat illumination pattern at a particular position of the rod. In this instance, the movable rod has a diameter of 7.95 mm.

Figure 5:
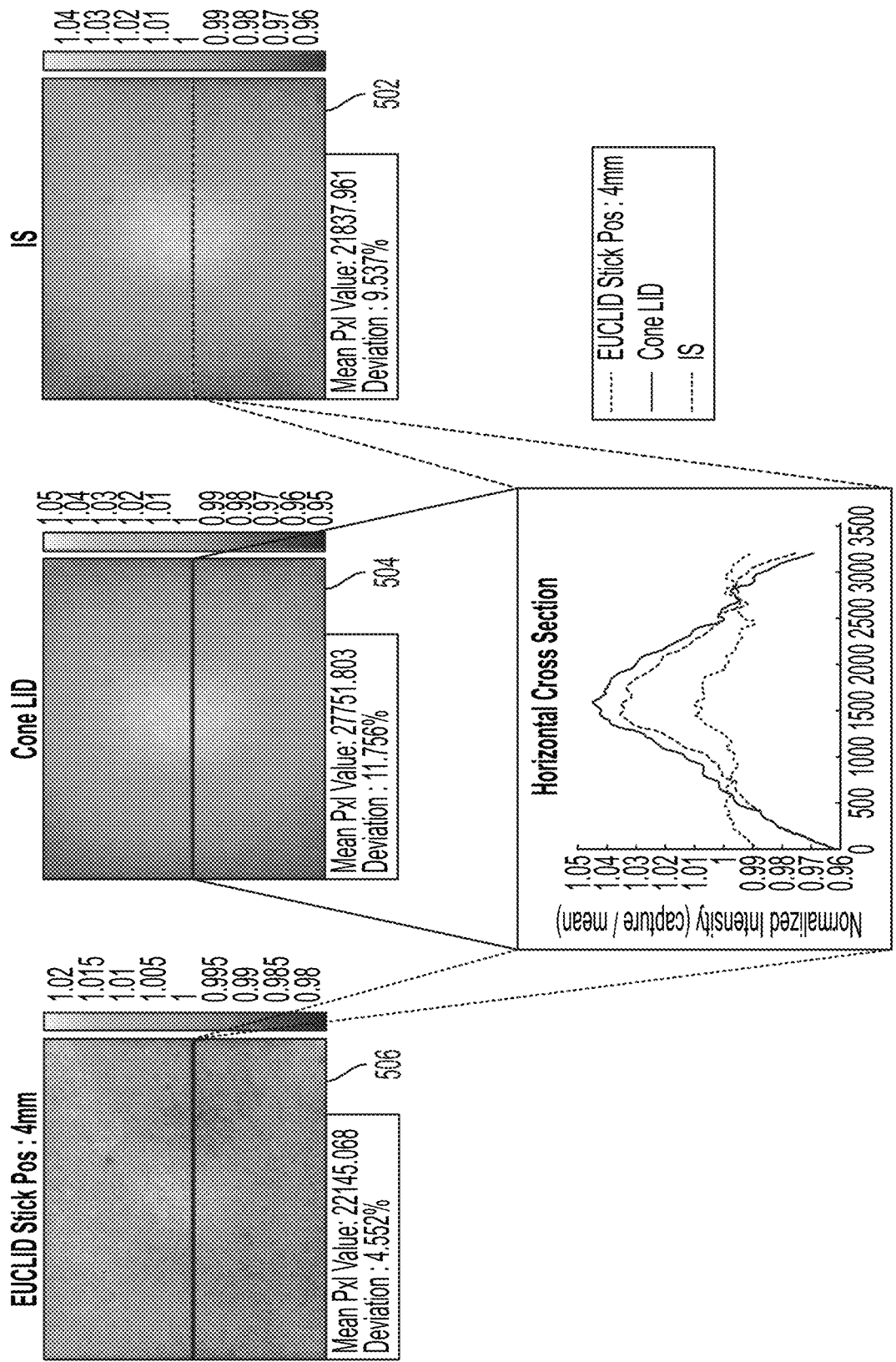
FIG. 5 are heatmap images of a spherical LID, conical LID, and EUCLID with a movable rod in terms of their uniformities under critical illumination.

FIG. 5 includes heatmap images of a spherical LID (inset 502), conical LID (inset 504), and EUCLID with a movable rod (Inset 506) in terms of their uniformities under critical illumination. In this case, spherical LID is an IS with a diameter of 25 mm, the conic LID has a cone angle of 23 degrees, and the EUCLID has a hole size of 7.95 mm at most uniform configurations. Moreover, FIG. 5 includes the graphical results 508 of the heatmap of the horizontal cross sections for the spherical LID, conical LID, and the EUCLID described here.

Figure 6:
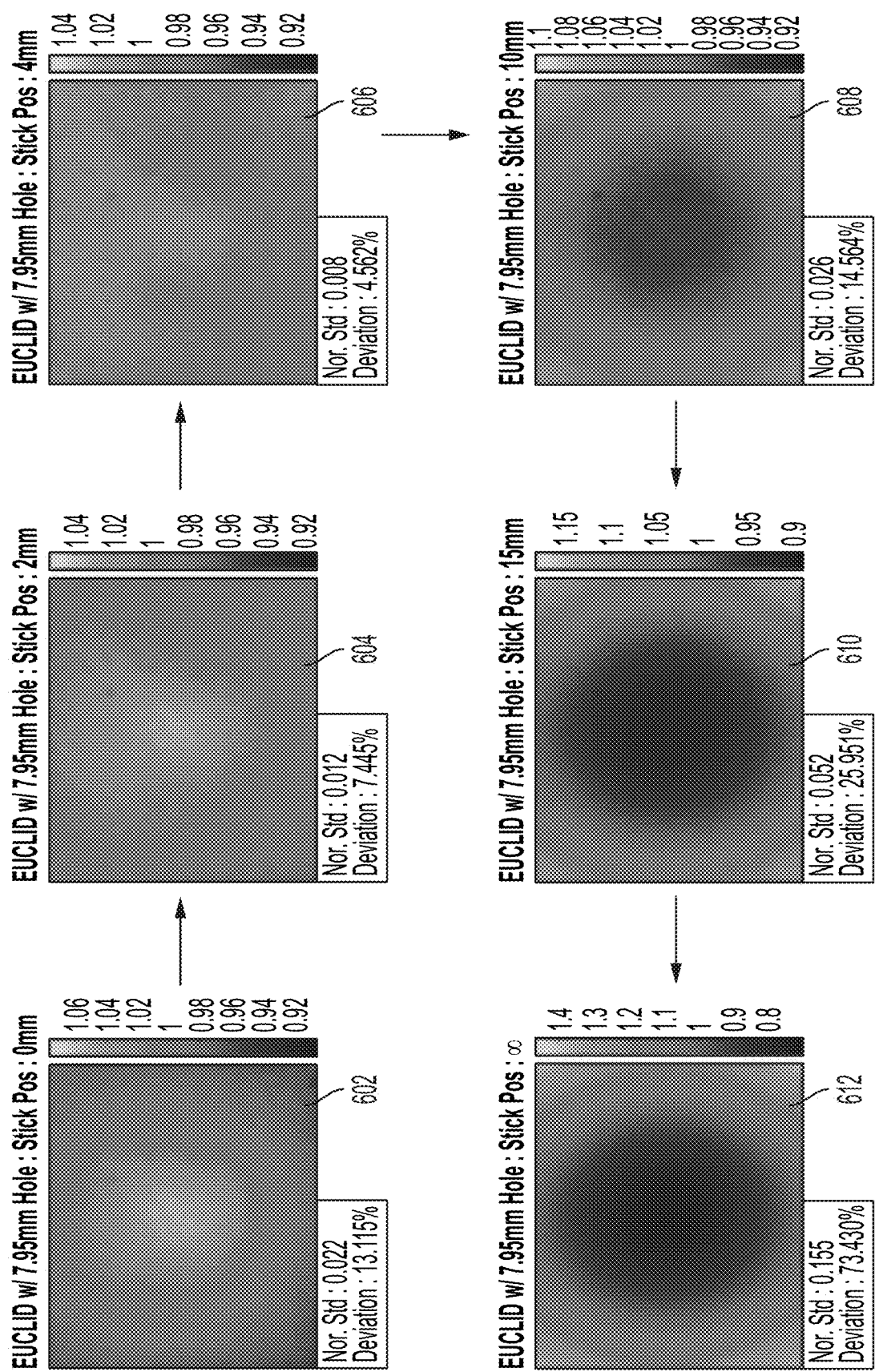
FIG. 6 are heatmap images of a EUCLID design and the effect of the movable rod on the light uniformity on a sample.

FIG. 6 are heatmap images 602-612 of a EUCLID design and the effect of the movable rod on the light uniformity on a sample. In this case, the EUCLID design has a 7 mm hole at one distal end of its conical cavity. One can see the closer the movable rod is to the hole the more uniformity is achieved. Images 602-612 shows the light uniformity when the movable rod is positioned at 0 mm, 2 mm, 4 mm, 10 mm, 15 mm, and infinity (when movable rod is completely removed) respectively. Images 602-612 are scaled to the pixel value deviation of a given EUCLID configuration.

Figure 7B:
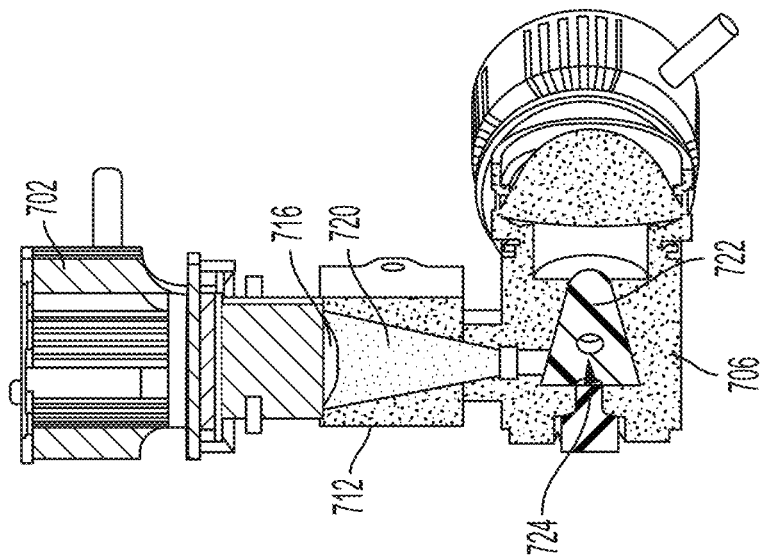
FIG. 7A-7C are schematic diagrams of an exemplary EUCLID having two LEDs.
Figure 7A:
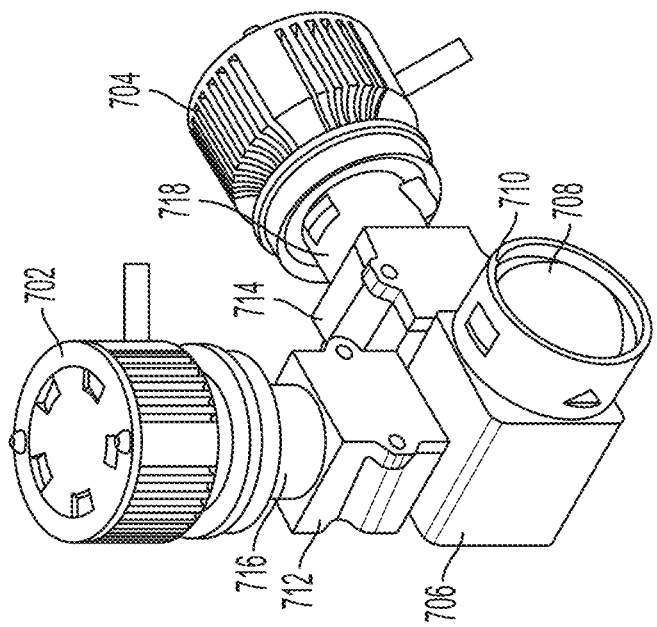
Figure 7C:
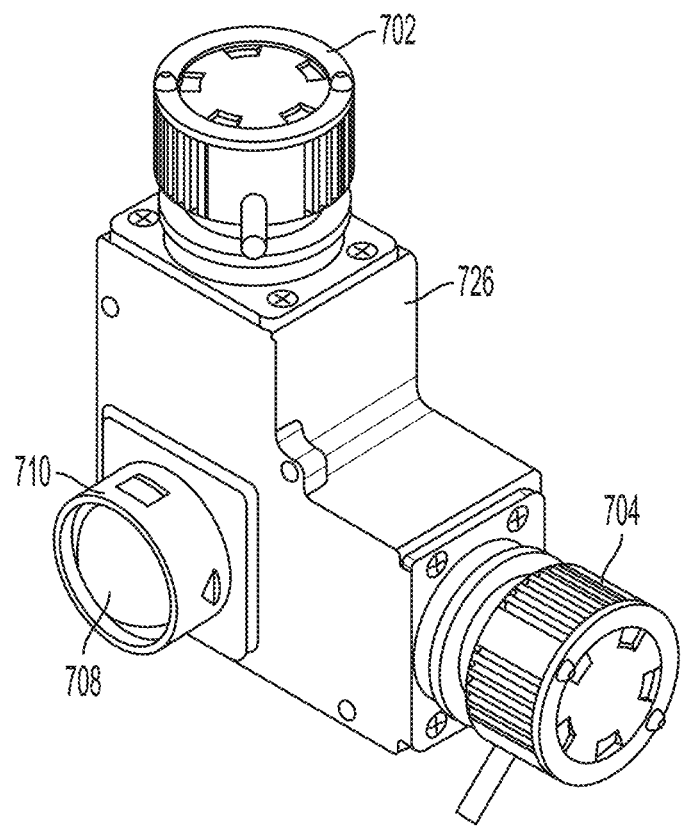

FIG. 7A-7C are schematic diagrams of an exemplary EUCLID 700 having two LEDs. FIG. 7A shows the detailed components of EUCLID 700. EUCLID 700 includes heatsinks 702 and 704, light integrating device 706, aspheric lens 708, lens structure 710, input ports 712 and 714, and LEDS 716 and 718. EUCLID 700 includes heatsinks 702 and 704 for cooling LEDs 716 and 718. LED 716 is connected to input port 712 and LED 718 is connected to input port 714. Input ports 712 and 714 are connected to light integrating device 706 at different positions. Each LED 716 and 718 produce collimated light at different wavelengths that are directed to light integrating device 706 via input ports 712 and 714 respectively.

Light integrating device 706 includes a conical hollow cavity as in conical cavity 102 of EUCLID 100. The illuminations from LEDs 716 and 718 are uniformly homogenized inside the conical hollow cavity of light integrating device 706 resulting in light integrating device 706 producing uniform light as output. The output of light integrating device 706 is collimated by using aspheric lens 708. Aspheric lens 708 is located inside a cylinder structure 710. Cylinder structure 710 is for adjusting the distance between the output of light integrating device 706 and aspheric lens 708.

FIG. 7B shows a cross-sectional view of input port 714, LED 718, and light integrating device 706. Input port 714 includes a conical cavity 720 for directing collimated light produced by LED 718 to light integrating device 706. Conical cavity 720 is made from polished aluminum or the like. This is done to reduce the input port dimensions. Note input port 714 also includes a conical cavity like conical cavity 720 to direct collimated light from LED 716 to light integrating device 706. FIG. 7B further shows an outer region of conical cavity 722 of light integrating device 706 with a hole 724. Hole 724 is configured to be an opening for input port 714 to send illumination from LED 718 to conical cavity 722. Light integrating device 706 is made from durable plastics, such as PTFE or the like. In this implementation, input port 714, input port 716, and output port are connected to the light integrating device at different positions that orthogonal without facing each other. The output of conical cavity 722 is positioned so it does not face input port 714 and input port 716. Moreover, the output of cavity 722 is directed to hollow cavity 728, which includes aspheric lens 708. One can laterally adjust, using lens adjustor 710, the position of aspheric lens 708 within cavity 728 to produce a collimated output.

FIG. 7C shows an enclosure 726 configured to protect EUCLID 700. Enclosure 726 protects within the components of EUCLID 700 except for heatsinks 702 and 704, aspheric lens 708, and lens structure 710. Enclosure 726 is made from any plastic materials capable of durable use, such as polytetrafluoroethylene (PTFE) or the like. In other implementations, enclosure 702 may be made from other materials capable of durable use.

EUCLID can be used with coherent light sources, such as lasers, to create uniform illumination. Usually, these sources can sometimes cause a speckle pattern due to their temporal and spatial coherence, which can be problematic in imaging applications. To address this issue, a laser-EUCLID is implemented. It can uniformly combine multiple coherent sources which can have different operating wavelengths on the one optical axis and provide speckle-free illumination. Additionally, the number of speckles can be adjusted as needed, and a randomized yet stable speckle pattern can be switched to a new random pattern when required.

Figure 8A:
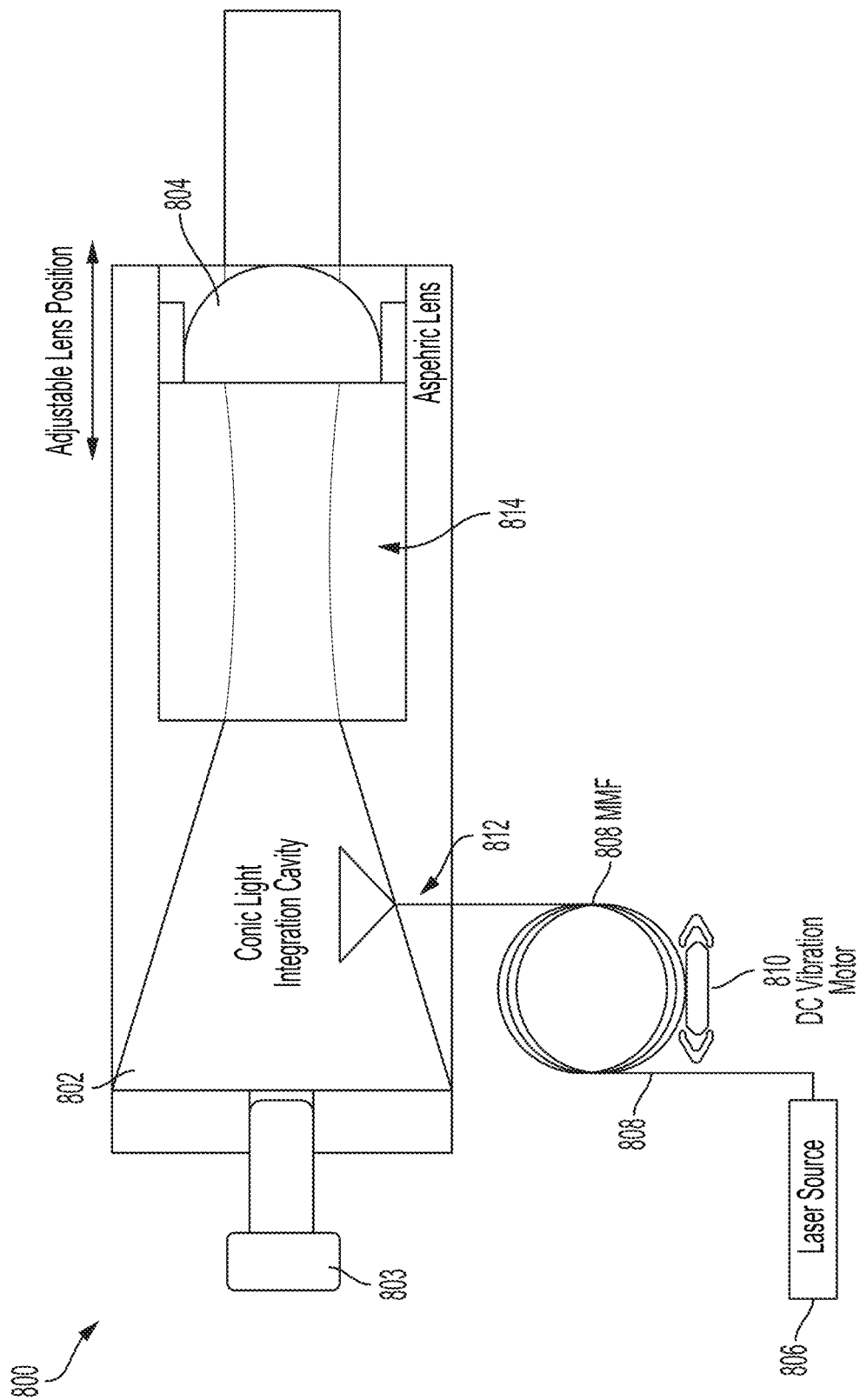
FIGS. 8A-8B are schematic diagrams of different exemplary implementations of laser-EUCLID.

FIG. 8A is a schematic diagram of an exemplary laser-EUCLID 800. Laser-EUCLID 800 includes a EUCLID 802, adjustable lens 804, laser source 806, multi-mode fiber (MMF) 808, and DC vibration motor 810. EUCLID 802 used in this implementation is similar to EUCLID 100 described earlier including having a movable rod 803. Laser-EUCLID 800 can be utilized by coupling the laser source 806 through an input port 812 of the EUCLID 802 via MMF 808. To vibrate MMF 808, a DC vibration motor 810 or the like can be used. Laser source 806 may include one or more lasers having same or multiple different wavelengths coupled to MMF 808. EUCLID 802, using its conical cavity, homogenizes the laser light input from laser source 806 to emit speckle-free uniform laser illumination at an output port of the light integrating device. The output of EUCLID 802 is directed to hollow cavity 814, which includes an adjustable lens 804. One can laterally adjust the position of adjustable lens 804 within cavity 814 to produce a collimated output. Adjustable lens 804 may be an aspheric lens or the like.

Figure 8B:
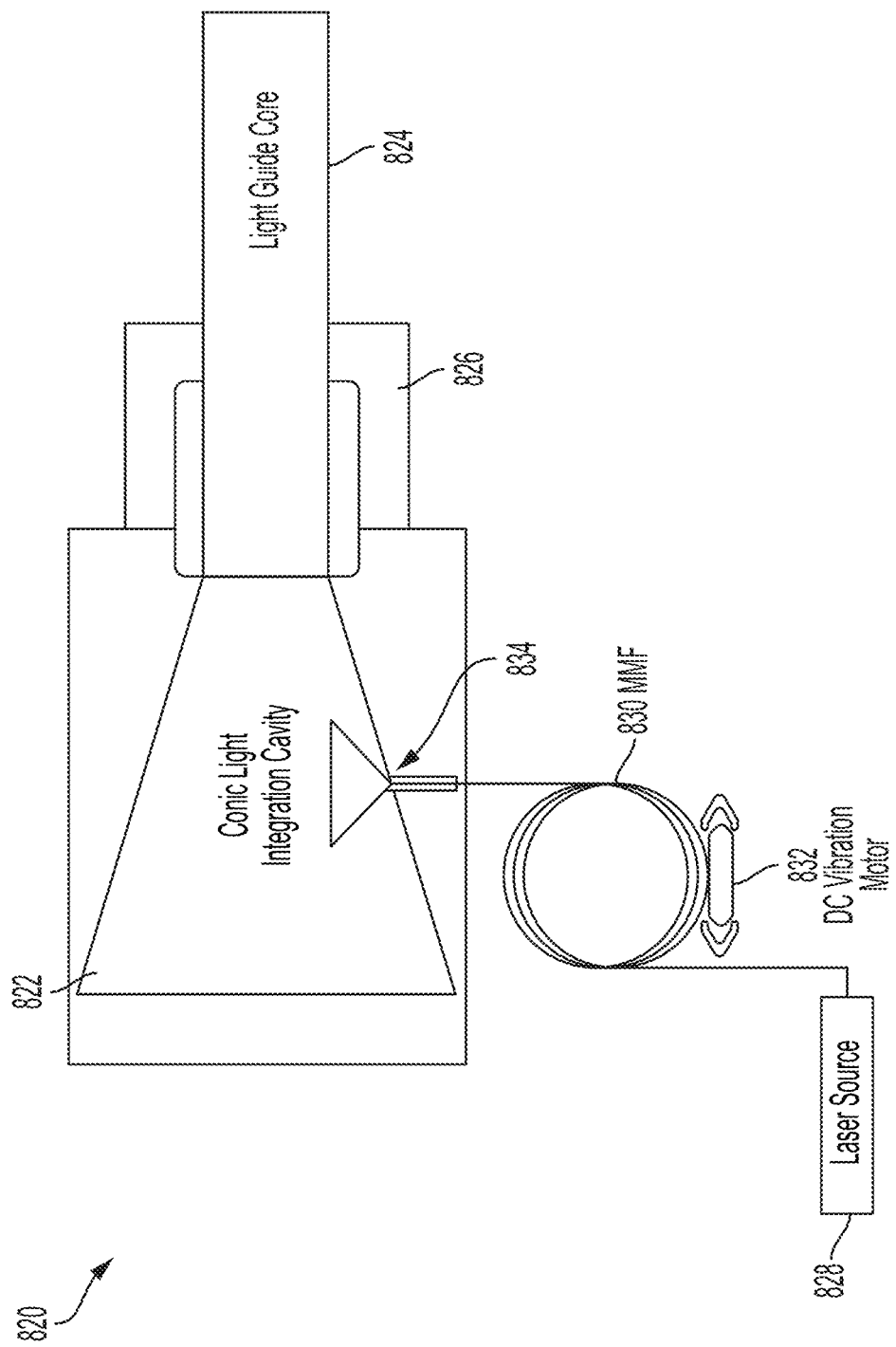

FIG. 8B is a schematic diagram of another exemplary laser-EUCLID 820. Laser-EUCLID 820 includes EUCLID 822, light guide core 824, light connector 826, laser source 828, multi-mode fiber (MMF) 830, and DC vibration motor 832. EUCLID 802 used in this implementation is similar to EUCLID 100 described earlier. In other implementations, EUCLID 802 may include a movable rod to adjust for light uniformity. Laser-EUCLID 822 can be utilized by coupling the laser source 828 through an input port 834 of the EUCLID 822 via MMF 830. To vibrate MMF 830, a DC vibration motor 832 or the like can be used. Laser source 828 may include one or more lasers having same or multiple different wavelengths. EUCLID 822, using its conical cavity, homogenizes the laser light input from laser source 828 to emit speckle-free uniform laser illumination at an output port of the light integrating device. The output of EUCLID 822 is directed to a light guide core 824 that passes thru a light connector 826. Light guide core 824 may be any kind of light guide that transmit light one point to another. Moreover, light guide core 824 may be made from glass, plastic, or the like. Light connector 826 is used to establish the connection between light guide core 824 and the output of EUCLID 822. Light connector 826 may be a SMA connector, liquid light guide connector, or the like.

In some implementations, laser source 806 or 822 may include one or more fiber-coupled lasers delivering laser light into EUCLID 802 or 822 thru a fiber. The fiber may be mechanically vibrated. The one or more fiber-coupled lasers may include a multi-mode fiber.

Figure 9:
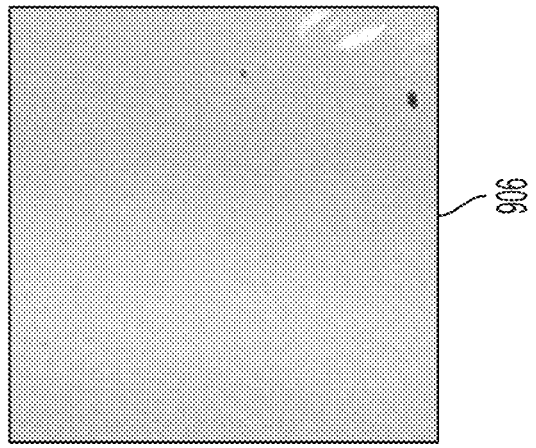
Figure 9:
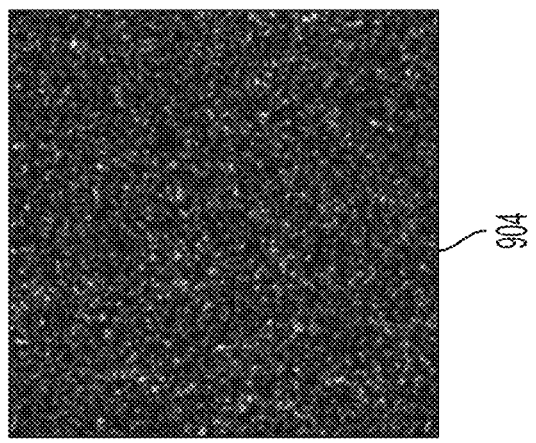
Figure 9:
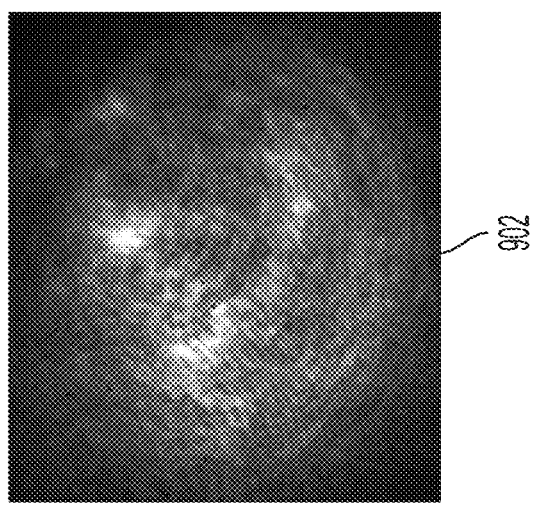

FIG. 9 shows the recording on the CMOS camera when a polished Si wafer is imaged without and with vibrations. As demonstrated, laser-EUCLID provides speckle-free uniform illumination that is not possible otherwise. Example image 902 shows the image in the case of direct coupling of the MMF output. The MMF is vibrated, and speckles are visible in the image. There is no field correction, and while the uniformity of illumination can be further improved using beam-shaping optics, one cannot reduce the speckles. Example image 904 shows when the MMF coupled to EUCLID with the DC vibration motor turned OFF. One can see maximum speckle. Finally, with the vibration motor turned ON, the EUCLID output is speckle free and very uniform, as shown in the example image 906.

Figure 10B:
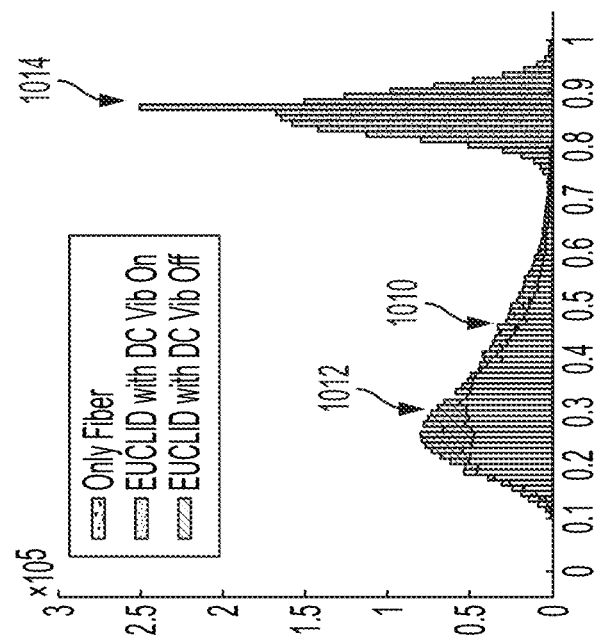
FIGS. 10A-10B are the line cuts of the images acquired with direct coupling of vibrated multi-mode fiber (MMF) and EUCLID outputs with vibration OFF and ON and corresponding intensity histograms.
Figure 10A:
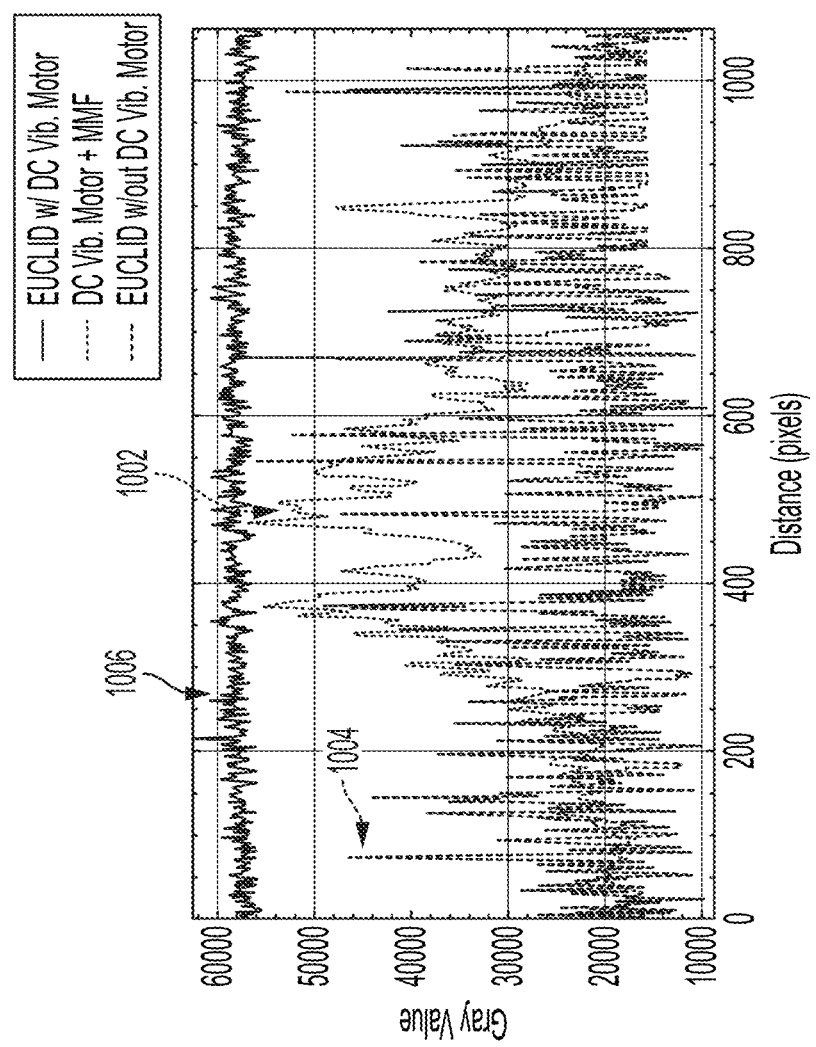

FIG. 10A shows exemplary line-cuts 1002-1006 associated with exemplary images 902-906 respectively for a semi-quantitative comparison. In this case, line-cut 1002 is associated with direct coupling of the MMF output, line-cut 1004 is associated with the MMF coupled to EUCLID with the DC vibration motor turned OFF, and line-cut 1006 is associated with the MMF coupled to EUCLID with the DC vibration motor turned ON. As shown, line-cut 1006 exhibits a high level of uniformity.

FIG. 10B shows exemplary intensity histograms 1010-1014 associated with exemplary images 1002-1006 respectively for a semi-quantitative comparison. In this case, histogram 1010 is associated with direct coupling of the MMF output, histogram 1012 is associated with the MMF coupled to EUCLID with the DC vibration motor turned OFF, and histogram 1014 is associated with the MMF coupled to EUCLID with the DC vibration motor turned ON. Histogram 1014 clearly shows the superior performance of Laser-EUCLID in flatness factor and plateau uniformity.

FIG. 11 shows a table 1102 of a performance comparison of EUCLID. In particular, table 1102 presents a performance evaluation of EUCLID while utilizing LEDs and lasers. It is noteworthy that EUCLID showcases superior performance compared to the existing speckle-free and commercial refractive optical element (ROE) solutions.

Figure 12B:
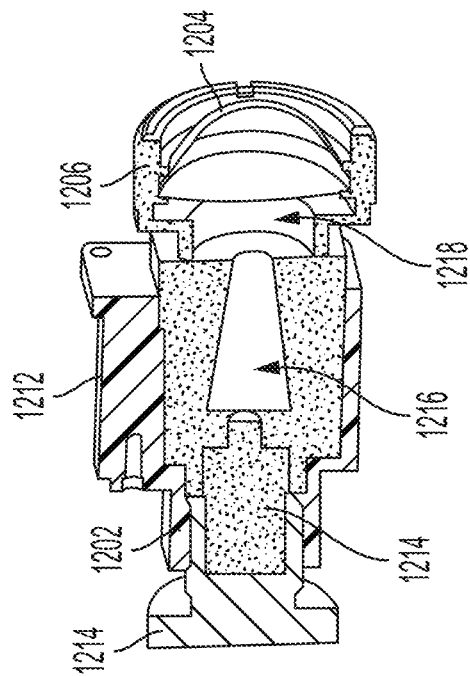
FIGS. 12A-12C are schematic diagrams of another exemplary laser-EUCLID.
Figure 12A:
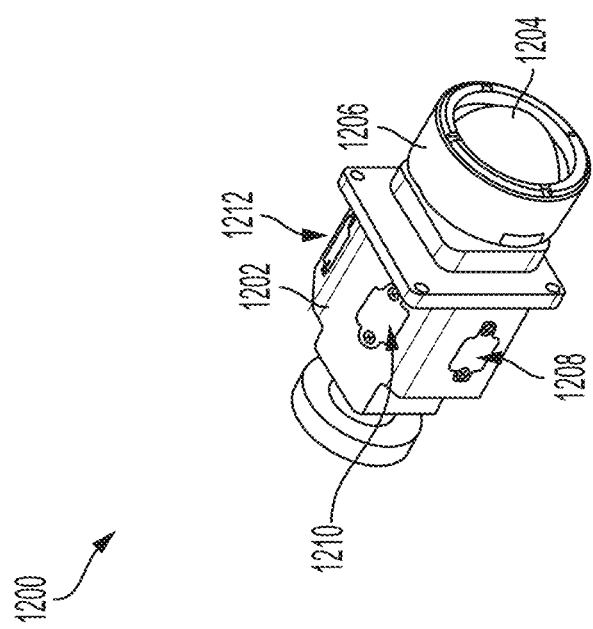
Figure 12C:
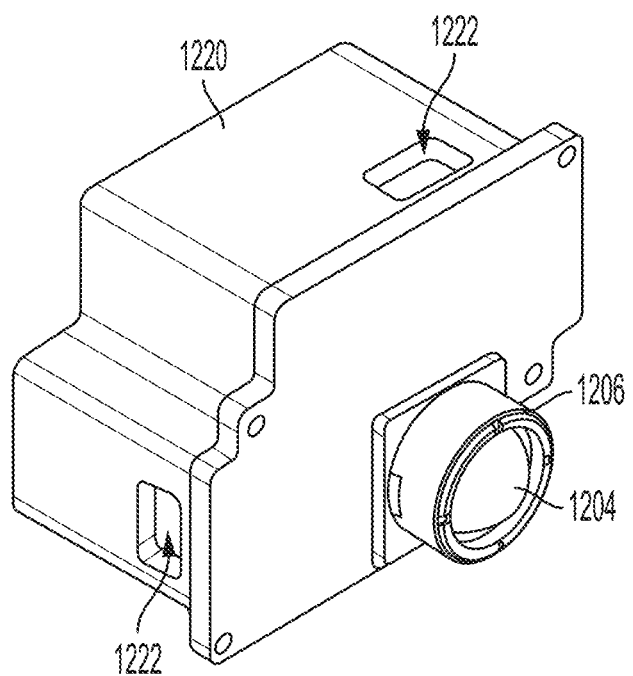

FIGS. 12A-12C are schematic diagrams of another exemplary laser-EUCLID 1200. FIG. 12A shows laser-EUCLID 1200 having a EUCLID 1202, aspheric lens 1204, lens adjuster 1206, and input ports 1208-1212. Note that laser-EUCLID 1200 is configured to operate like a light integrating device like laser-EUCLID 800. Also, EUCLID 1202 includes a conical cavity like EUCLID 802 to produce uniform laser light, including a movable rod 1214 to control the uniformity of the laser light and speckle outputted from EUCLID 1202. One may make EUCLID 1202 from durable plastics, such as PTFE or the like. Aspheric lens 1204 is like adjustable lens 804, including how to adjust the distance between the output of EUCLID 1202 and aspheric lens 1204 using lens adjustor 1206. In this implementation, laser-EUCLID 1200 includes three input ports 1208-1212 for receiving laser light from three different MMF fibers. In other implementations, laser-EUCLID may have more or less input ports. Note each MMF fiber may be connected to a DC vibration motor.

FIG. 12B shows a cross-sectional view of EUCLID 1202, input port 1212, aspheric lens 1204, and lens adjustor 1206. In particular, FIG. 12B shows a hollow conical cavity 1216 of EUCLID 1202. Each input port 1208-1212 directs the received laser light from the different MMFs to conical cavity 1216. When the vibration motor for each MMF fiber is turned ON and connected to EUCLID 1202, EUCLID 1202 homogenizes the optical illuminations from its internal LEDs and received laser light from different MMFs to emit a uniform and speckle-free laser light as output.

Movable rod 1214 controls uniformity and speckle of light emitted by conical cavity 1216 by modifying the back surface of conical cavity 1216 using movable rod 1214. In this implementation, conical cavity 1216 may have a hole (of different diameters) on its back surface with movable rod 1214 to provide an adjustable radiance profile (low output angles). Moreover, the output of conical cavity 1216 is directed to hollow cavity 1218, which includes an aspheric lens 1204. One can laterally adjust, using lens adjustor 1206, the position of aspheric lens 1204 within cavity 1218 to produce a collimated output.

In FIG. 12C, an enclosure 1220 is configured to protect laser-EUCLID 1200. This enclosure 1220 safeguards all the components within laser-EUCLID 1200, except for aspheric lens 1204 and lens adjustor 1206. Additionally, there are openings 1222 that coincide with input ports 1208-1212 to receive the three MMFs. Enclosure 1220 can be made from various durable plastic materials, such as polytetrafluoroethylene (PTFE) or similar materials. It is also possible to create enclosure 1220 using other durable materials.

Figure 13A:
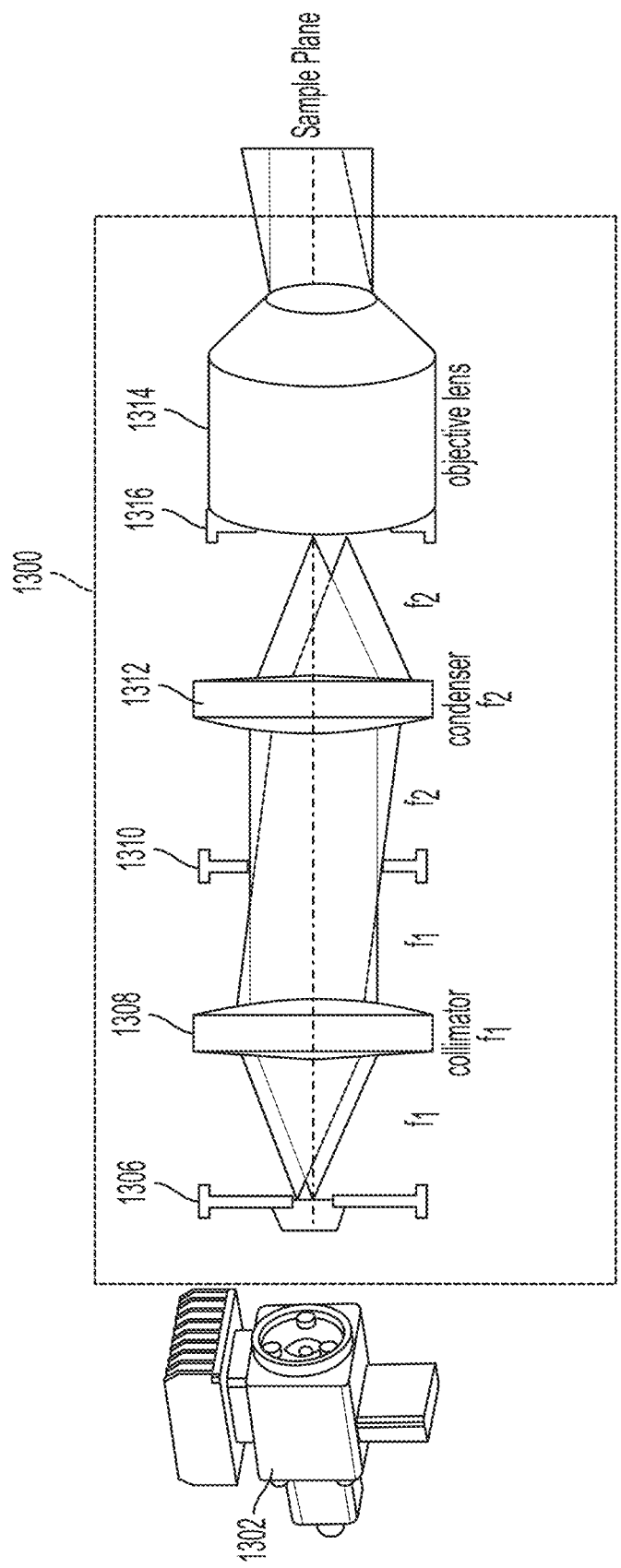
FIGS. 13A-13C are schematic diagrams of an exemplary imaging system using EUCLID and LEDs.

FIG. 13A shows an exemplary imaging system 1300 using EUCLID for imaging. Illumination source 1302 provides illumination to imaging system 1300 for imaging a sample or the like. Illumination source 1302 may include EUCLID 100 or 700 described herein, where the output is a highly uniform light. Moreover, illumination source 1302 may include laser-EUCLID 800, 820, or 1200 described herein, where the output is speckle-free and uniform laser light. In both instances, the output of illumination 1302 is directed to lens arrangement 1304.

Imaging system 1302 produces Koehler illumination for imaging using a 4f Koehler alignment. In other implementations, imaging system 1302 may include other configurations for producing different illumination types besides Keohler illumination. In particular, imaging system 1302 includes a pupil 1306, a collimator lens 1308, a pupil 1310, a condenser lens 1312, an objective lens 1314, and an objective back focal aperture stop 1316. The distance between pupil 1306 and collimator lens 1308 is the focal distance f1 of collimator lens 1308. The distance between pupil 1310 and collimator lens 1308 is also f1. The distance between pupil 1310 and condenser lens 1312 is the focal length f2 of condenser lens 1312. The distance between objective lens 1314 and condenser lens 1312 is also f2.

In this implementation, pupil 1306 receives the output light from illumination source 1302 and directs the received light to collimator lens 1308. Collimator lens 1308 focuses and leads the received light to pupil 1310. Pupil 1310 direct its received light to condenser lens 1312. Condenser lens 1312 focuses its received light to objective back focal aperture stop 1316 to be received by objective lens 1314. Objective lens 1314 outputs light defined by Koehler illumination to be applied for imaging on a sample plane.

Figure 13B:
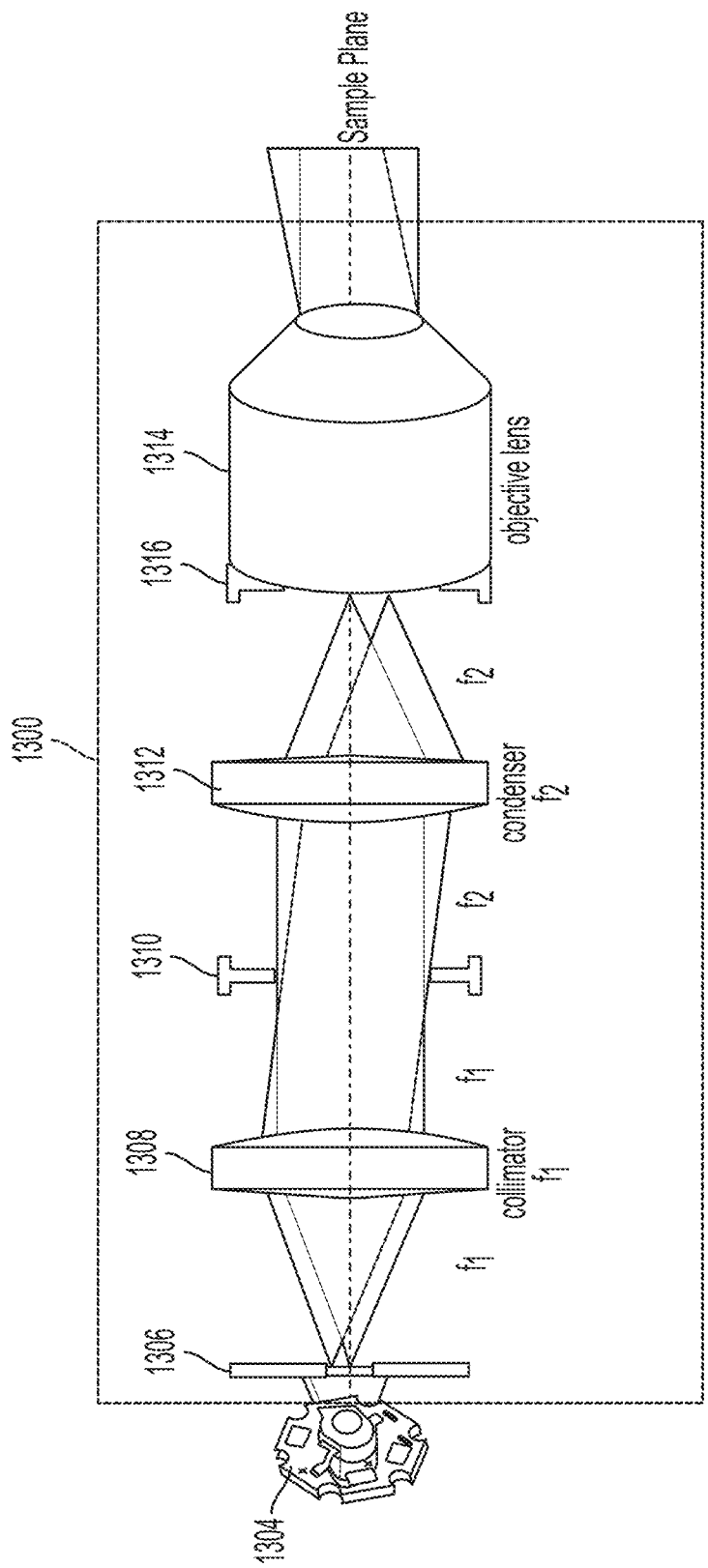
Figure 13C:
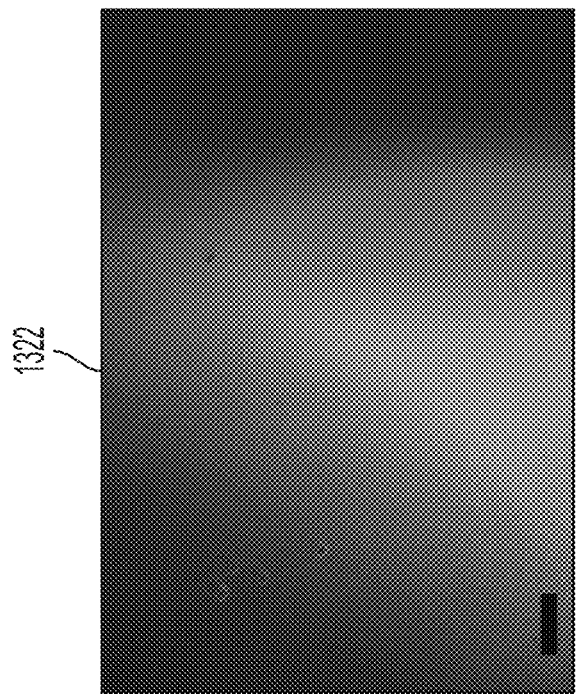
Figure 13C:
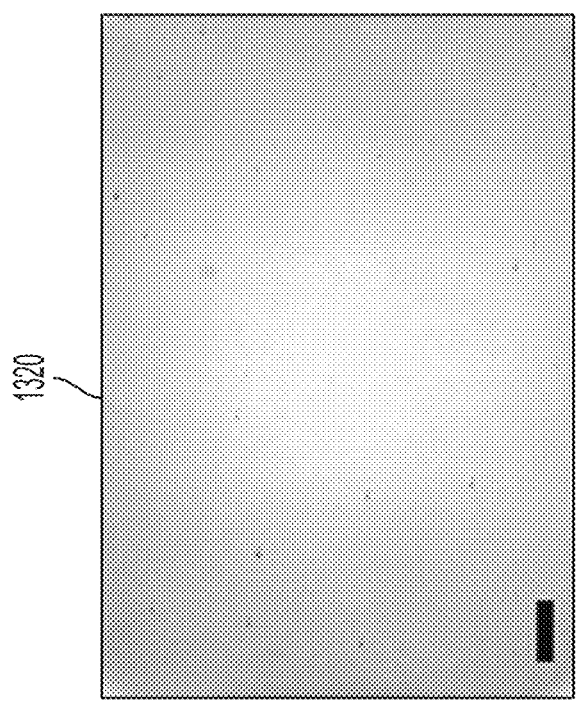

FIG. 13B shows LED illumination source 1304 is directly connected to the same imaging system 1302. Nevertheless, the output image 1320, generated through EUCLID, is highly uniform and free of speckles, with no skew, making it a suitable option for imaging purposes, as shown in FIG. 13C. On the other hand, image 1322, associated with LED usage, shows a skewed illumination, which is not desirable for imaging purposes, as shown in FIG. 13C. Hence, it is conclusive that EUCLID is a preferred option for Koehler illumination and other similar applications.

Figure 14:
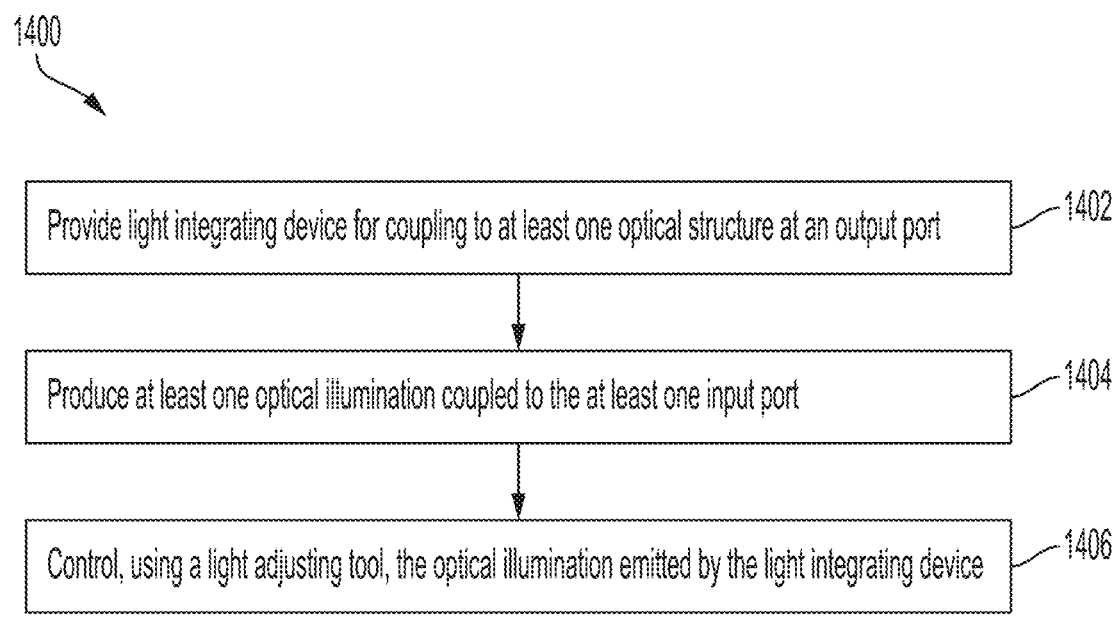
FIG. 14 is a process flowgraph of operations included in an exemplary process for producing illumination.

FIG. 14 is a process flowgraph of operations included in an exemplary process 1400 for producing illumination. Process 1400 includes providing a light integrating device (such as EUCLID 102, 706, 802, 822, or 1202) for coupling to at least one optical structure (such as imaging system 1300, lenses) at an output port (such as output port 110) (Step 1402). The light integrating device includes at least one input port (such as input port 104, 712, or 714). Process 1400 includes producing, using at least one light source (such as LED 106, 716, or 718), at least one optical illumination coupled to the at least one input port (Step 1404). Process 1400 includes controlling, using a light adjusting tool (such as movable rod 108 or 1214), the optical illumination emitted by the light integrating device (Step 1406). The light adjusting tool controls uniformity of light emitted by the light integrating device by modifying at least one internal surface of the light integrating device.

In some implementations, the at least one input port and the output port may be positioned not to face each other on the at least one internal surface of the light integrating device. The light integrating device may include an internal shape nominally conical. The light integrating device may include an apex at the output port coupling to the at least one optical structure. The apex angle may be optimized to maximize light coupled to the at least one optical structure at the output port. The at least one light source may include a light emitting diode (LED) at the at least one input port. The at least one light source may include a plurality of LEDs at the at least one input port. The light source may include at least one laser at the at least one input port. The at least one laser may be mechanically vibrated. The light source may include at least one fiber-coupled laser delivering the at least one optical illumination into the light integrating device through a fiber. The fiber may be mechanically vibrated. The light adjusting tool may include a manual adjustment knob positioned at a distal end of the light adjusting tool for modifying the internal surface. The internal surface of the light integrating device may include diffused reflecting material. The light integrating device may include polytetrafluoroethylene (PTFE).

Figure 15:
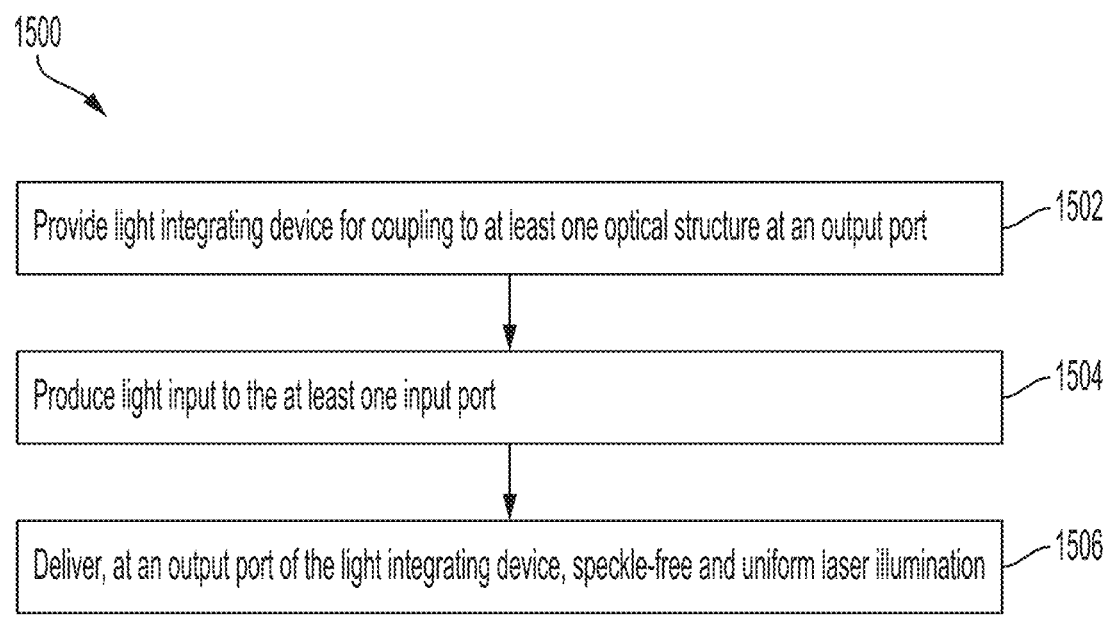
FIG. 15 is another process flowgraph of operations included in an exemplary process for producing illumination.

FIG. 15 is a process flowgraph of operations included in an exemplary process 1500 for producing illumination. Process 1500 includes providing a light integrating device (such as EUCLID 102, 706, 802, 822, or 1202) for coupling to at least one optical structure (such as imaging system 1300, lenses) at an output port (such as output port 110) (Step 1502). The light integrating device includes at least one input port ((such as input port 104, 712, or 714). Process 1500 includes producing, using at least one laser source (such as laser source 806 or 828) coupled to at least one vibration source (such DC vibration motor), light input to the at least one input port (Step 1504). Process 1500 includes delivering, at an output port (such as output port 110) of the light integrating device, speckle-free and uniform laser illumination (Step 1506). The light integrating device homogenizes the light input from the at least one laser source.

In some implementations, the at least one input port and the output port may be positioned not to face each other on an internal surface of the light integrating device. The light integrating device may include an internal shape nominally conical. The light integrating device may include an apex at the output port coupling to the at least one optical structure. The apex angle is optimized to maximize light coupled to the at least one optical structure at the output port. The internal surface of the light integrating device may include a diffused reflecting material. The light integrating device may include polytetrafluoroethylene (PTFE). The at least one laser source may include a plurality of laser sources for providing light input to the light integration device at the same or different wavelengths at the at least one input port. The at least one laser source may include at least one fiber-coupled laser delivering the at least one optical illumination into the light integrating device thru a fiber. The at least one fiber-coupled laser may include a multi-mode fiber. The fiber may be mechanically vibrated.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. An illumination source comprising:
a light integrating device for coupling to at least one optical structure at an output port, where the light integrating device includes at least one input port;
at least one light source for producing at least one optical illumination coupled to the at least one input port; and
a light adjusting tool for controlling the optical illumination emitted by the light integrating device, wherein the light adjusting tool controls uniformity of light emitted by the light integrating device by modifying at least one internal surface of the light integrating device, and wherein the light integrating device comprises a conical internal shape with an apex at the output port coupling to the at least one optical structure.

2. The illumination source of claim 1, wherein the at least one input port and the output port are positioned not to face each other on the at least one internal surface of the light integrating device.

3. The illumination source of claim 1, wherein the apex comprises an angle optimized to maximize light coupled to the at least one optical structure at the output port.

4. The illumination source of claim 1, wherein the at least one light source comprises a light emitting diode (LED) at the at least one input port.

5. The illumination source of claim 1, wherein the at least one light source comprises a plurality of LEDs at the at least one input port.

6. The illumination source of claim 1, wherein the light source comprises at least one laser at the at least one input port.

7. The illumination source of claim 6, the at least one laser is mechanically vibrated.

8. The illumination source of claim 1, wherein the at least one light source comprises at least one fiber-coupled laser delivering the at least one optical illumination into the light integrating device through a fiber.

9. The illumination source of claim 8, wherein the fiber is mechanically vibrated.

10. The illumination source of claim 1, wherein the light adjusting tool comprises a manual adjustment knob positioned at a distal end of the light adjusting tool for modifying the internal surface.

11. The illumination source of claim 1, wherein the internal surface of the light integrating device comprises diffused reflecting material.

12. The illumination source of claim 1, wherein the light integrating device comprises polytetrafluoroethylene (PTFE).

13. A method for producing illumination, the method comprising:
providing a light integrating device for coupling to at least one optical structure at an output port, where the light integrating device includes at least one input port;
producing, using at least one light source, at least one optical illumination, the at least one light source coupled to the at least one input port; and controlling, using a light adjusting tool, the optical illumination emitted by the light integrating device, wherein the light adjusting tool controls uniformity of light emitted by the light integrating device by modifying at least one internal surface of the light integrating device, and wherein the light integrating device comprises a conical internal shape with an apex at the output port coupling to the at least one optical structure.

14. The method of claim 13, wherein the apex comprises an angle optimized to maximize light coupled to the at least one optical structure at the output port.

* * * * *